US006282233B1

United States Patent
Yoshida

(10) Patent No.: US 6,282,233 B1
(45) Date of Patent: Aug. 28, 2001

(54) MULTI-USER RECEIVING APPARATUS AND CDMA COMMUNICATION SYSTEM

(75) Inventor: Shousei Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/287,563

(22) Filed: Apr. 6, 1999

(30) Foreign Application Priority Data

Apr. 7, 1998 (JP) .................................................. 10-094623

(51) Int. Cl.[7] .................................................. H04J 13/04
(52) U.S. Cl. .................................................. 375/148
(58) Field of Search .................................................. 375/144, 148, 375/349; 370/335, 342, 479

(56) References Cited

U.S. PATENT DOCUMENTS

| 5,966,403 | * | 10/1999 | Pon | 375/208 |
| 6,192,066 | * | 2/2001 | Asanuma | 375/130 |
| 6,208,683 | * | 3/2001 | Mizuguchi et al. | 375/140 |

FOREIGN PATENT DOCUMENTS

| 9-270736 | 10/1997 | (JP) . |
| 9-270766 | 10/1997 | (JP) . |
| 10-51353 | 2/1998 | (JP) . |

* cited by examiner

*Primary Examiner*—Amanda T. Le
(74) *Attorney, Agent, or Firm*—Sughrue, Mion, Zinn, Macpeak & Seas, PLLC

(57) ABSTRACT

A multi-user receiving apparatus for inputting a CDMA reception signal, performing an interference canceling process in parallel for each user signal on an m-th stage of M stages (where m is any integer of $1 \leq m \leq M$; and M is any integer of $M \geq 2$), and outputting demodulated signals on the M-th stage is disclosed, that comprises a plurality of IEUs (interference estimating units) disposed corresponding to the (M−1) stages and the number of user signals, and a plurality of subtracting units disposed corresponding to the (M−1) stages, wherein each of the IEUs Inputs an interference cancellation residual signal obtained in an (m−1)-th stage interference canceling process and a signal of which a symbol replica corresponding to the same user signal on the (m−1)-th stage is weighted with a first weighting coefficient, generates an m-th stage symbol replica, outputs the m-th stage symbol replica to the (m+1)-th stage, and outputs a spread signal that is the difference between the m-th stage symbol replica and the (m−1)-th stage symbol replica weighted with the first weighting coefficient, and wherein each of the subtracting units subtracts signals of which the spread signals that are output from the IEUs on the m-th stage are weighted with a second weighting coefficient from a signal of which the (m−1)-th stage interference cancellation residual signal is delayed by a predetermined value and outputs the resultant signal to the (m+1)-th stage.

32 Claims, 7 Drawing Sheets

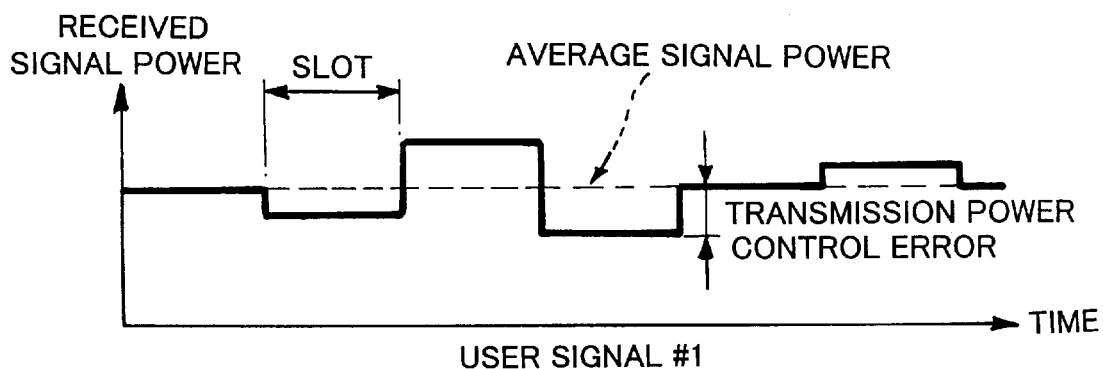
FIG. 4A — USER SIGNAL #1
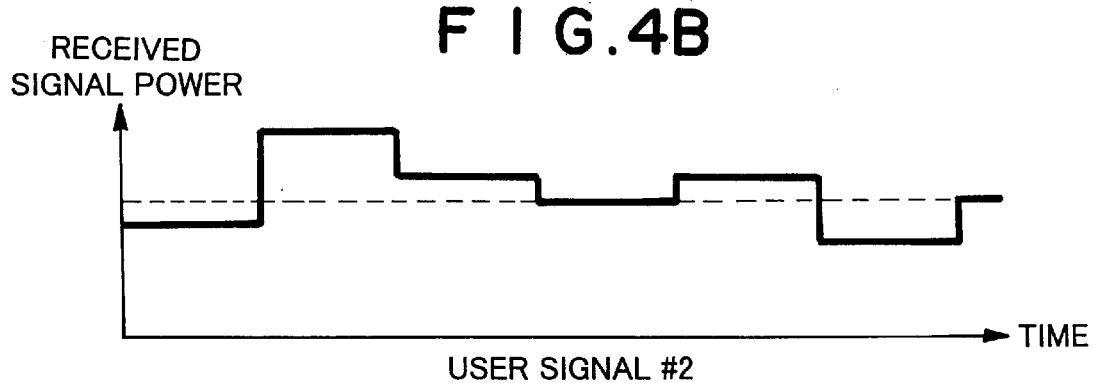
FIG. 4B — USER SIGNAL #2
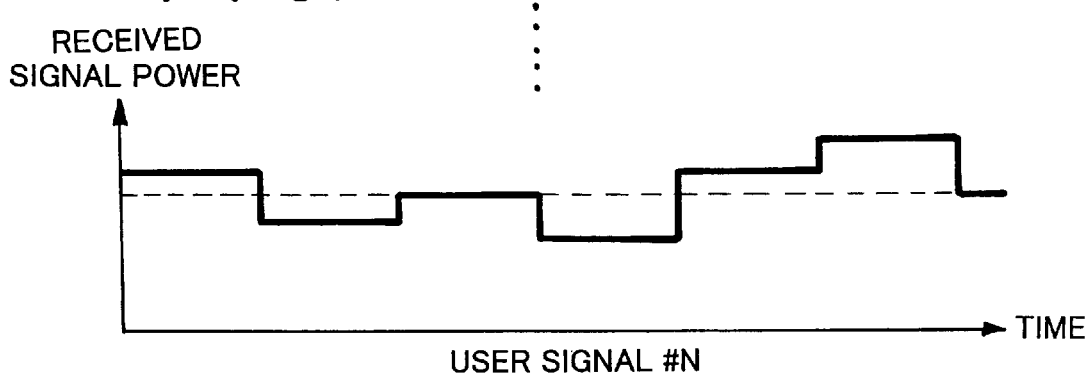
FIG. 4C — USER SIGNAL #N

MULTI-USER RECEIVING APPARATUS AND CDMA COMMUNICATION SYSTEM

BACKGROUND OF THE INVENTION

1. Field of the Invention

The present invention relates to a CDMA (Code Division Multiple Access) multi-user receiving apparatus for performing an interference canceling process in parallel for individual users on a plurality of stages and for outputting demodulated signals for the individual users on the last stage, in particular, to a multi-user receiving apparatus with excellent interference cancellation characteristics in a small hardware scale.

2. Description of the Related Art

CDMA system using direct sequence (DS) spreading process (hereinafter referred to as DS-CDMA system) has become attractive as a multiple access system for a mobile communication system having a base station and portable mobile stations because of the probability of remarkable increase of the subscriber capacity. In the DS-CDMA system, each user signal is spreaded in a wide frequency band with particular code and transmitted to a propagation path. On the receiver side, the code-multiplexed signal is de-spreaded and a desired signal is detected. When spreaded codes assigned to individual users correlate, they interfere and the reception characteristics deteriorate.

As an interference canceler, a multi-user receiving apparatus that cancels such interferences using spreaded codes of all users and characteristics of propagation paths is known. An example of such a multi-user receiving apparatus has been disclosed by M. K. Varanasi and B. Aashang "Multi-stage Detection in Asynchronous Code-Division Multiple-Access Communications", IEEE Trans, Commun., vol. COM-38, No. 4. pp. 509–519, April 1980. In the example, the first stage circuit demodulates all user signals, generates interference replicas of the user signals, and subtracts interference replicas other than an interface replica for a desired user signal from the received signal. The next stage circuit demodulates the desired user signal with the output signal of the first stage circuit. Thus, the demodulated result of the second stage circuit is improved in comparison with the demodulated result of the first stage circuit. In the multi-stage structure, the interference canceling process is repeated a plurality of times and thereby the interference cancellation characteristics are improved.

Another related art reference has been disclosed by Fukasawa, Satoh (T), Kawabe, and Satoh (S) "Structure and Characteristics of Interference Canceler Based on Estimation of Propagation Path Using Pilot Signal (translated title)" Journal of The Institute of Electronics, Information and Communication Engineers, Japan, B-II Vol. J77-B-II No. 11, November 1994. In the related art reference, an interference cancellation residual signal propagation structure is used to simplify the apparatus. In addition, a determination symbol for each user signal is treated as a replica. Thus, the hardware scale is reduced. However, in the detecting process on each stage, interfered propagation path characteristics estimated on the first stage are used. Thus, when an estimated error of a propagation path is large, the interference cancellation characteristics largely deteriorate.

In a recent year, a modification system of such a related art reference has been proposed. In the system, a propagation path is estimated on each stage rather than the first stage so as to suppress the deterioration of interference cancellation characteristics against a propagation path estimation error. Such a system has been disclosed by Sawahashi, Miki, Andoh, and Higuchi "Sequential Channel Estimation Type Serial Canceler Using Pilot Symbols in DS (Direct Sequence)—CDMA", The Institute of Electronics, Information and Communication Engineers, Japan, Wireless Communication System Study Group Technical Report, RCS95-50, July 1995. In the technical paper, a serial process structure for sequentially demodulating and canceling interferences of user signals in the order of higher reception signal levels is used. Another related art reference has been disclosed by Yoshida and Atokawa "Sequential Propagation Path Estimation Type CDMA Multi-Stage Interference Canceler Using Symbol Replica Process" The Institute of Electronics, Information and Communication Engineers, Japan, Wireless Communication System Study Group Technical Report, RCS96-171, February, 1997 (Japanese Patent Laid-Open Publication No. 10-51353). As with the system proposed by Fukasawa et. al., in the system proposed by Yoshida et. al., although a symbol replica process is performed in an interference cancellation residual propagation type structure, symbol replicas for individual user signals are handled so as to sequentially estimate propagation paths. Thus, the hardware scale can be reduced and the interference cancellation characteristics can be improved.

FIG. 8 is a block diagram showing an example of the structure of a CDMA multi-user receiving apparatus disclosed by Yoshida et. al as Japanese Patent Laid-Open Publication No. 10-51353. In FIG. 8, the apparatus has a plurality of IEUs 112-m-n disposed on a plurality of stages. IEUs 112-m-n disposed on each stage correspond to individual user signals. An IEU 112-m-n that corresponds to the highest hierarchical level user signal performs an interference canceling process for the lowest hierarchical level user signal on the preceding (m−1)-th stage. An IEU 112-m-n that corresponds to other than the highest hierarchical level user signal performs an interference canceling process for the (n−1)-th hierarchical level user signal. An IEU 112-m-n inputs an error signal obtained in the interference canceling process and an interference replica estimated by the IEU 112-(m−1)-n corresponding to the same hierarchical level user signal on the preceding stage, re-estimates the current m-th stage interference replica, outputs the re-estimated interference replica to an IEU 112-(m+1)-n corresponding to the same hierarchical level user signal on the next (m+1)-th stage, and outputs the result of the diffusing process as the difference between an interference replica on the current m-th stage and an interference replica on the preceding (m−1)-th stage. IEU 112-M-1, . . . , IEU 112-M-N on the last M-th stage output demodulated results as demodulated user signals rather than re-estimating interference replicas on the current M-th stage.

As shown in FIG. 8, the interference canceling process is performed by M column×N line circuits (where M represents the number of stages; and N represents the number of user signals). Reception levels of individual user signals are pre-assigned. Each user signal is connected to each stage in series corresponding to a reception level. A demodulating process and an interpolation canceling process are performed for user signals in the order from the highest signal level to the lowest signal level. In this structure, since the interference canceling process is performed in series, interference replicas can be sequentially canceled. Thus, although excellent interference cancellation characteristics are accomplished, the circuit structure is complicated and a delay in the demodulating process is large.

FIG. 9 is a block diagram showing another example of the structure of a CDMA multi-user receiving apparatus. In the receiving apparatus, the delay of the demodulating process is small. The interference canceling process is a simple parallel structure apparatus. The receiving apparatus has multiplying units disposed on the output side of interference estimating units IEU. Each multiplying unit multiplies an output signal of the interference estimating unit by a weighting coefficient α that is 1 or smaller. Thus, the interference cancellation characteristics are improved.

The CDMA multi-user receiving apparatus shown in FIG. 9 has M stags (where M is any integer that is two or larger) for demodulating N user signals (where N is any integer that is 1 or larger). A first stage interference canceling process circuit 101-1 comprises a delaying unit 103-1, interference estimating units (IEU) 102-1-1 to 102-1-N, multiplying units 105-1-1 to 105-1-N, and a subtracting unit 104-1. The multiplying units 105-1-1 to 105-1-N multiply output signals of the interference estimating units 102-1-1 to 102-1-N by a weighting coefficient α, respectively. The subtracting unit 104-1 subtracts output signals of the multiplying units 105-1-1 to 105-1-N from an output signal of the delaying unit 103-1.

An interference estimating unit (IEU) 102-m-n on the m-th stage (where m is any integer of $1 \leq m \leq M$) for the n-th user signal (where n is any integer of $1 \leq n \leq N$) inputs an interference cancellation residual signal (an output signal of a subtracting unit 104-(m−1)) obtained in the interference canceling process on the (m−1)-th stage and a symbol replica (a replica that is output from an IEU 102-(m−1)-n) corresponding to the same user signal on the (m−1)-th stage, generates an m-th stage symbol replica, outputs the generated symbol replica to the (m+1)-th stage, and outputs a spreaded signal that is the difference between the m-th stage symbol replica and an (m−1)-th stage symbol replica.

A multiplying unit 105-m-n multiplies the output signal of the interference estimating unit 102-m-n by the weighting coefficient α. A subtracting unit 104-m subtracts the output signals of the multiplying units 105-m-n for all user signals from a signal of which the (m−1)-th stage interference cancellation residual signal is delayed by a delaying unit 103-m for the IEU process, updates the interference cancellation residual signal, and outputs the resultant signal to the (m+1)-th stage.

FIG. 2 is a block diagram showing the structure of the interference estimating unit (IEU) 102-m-n. The IEU 102-m-n has a plurality of path processing portions (#1 to #K) corresponding to a plurality of propagation paths as a multi-path. An inversely spreading means 11 inputs an (m−1)-th stage interference cancellation residual signal (an output signal of a subtracting unit 104-(m−1)). The despreading means 11 performs an despreading process for a signal corresponding to the each path. A first adding unit 12 adds an output signal of the despreading means 11 and an (m−1)-th stage symbol replica (a replica that is output from an IEU 102-(m−1)-n). A detecting unit 13 inputs an output signal of the first adding unit 12. A propagation path estimating means 20 detects a propagation path estimation value corresponding to the each path. A complex conjugate means 21 outputs a complex conjugate value to a multiplying unit 22. The multiplying unit 22 multiplies the complex conjugate value by the output signal of the first adding unit 12 so as to demodulate the signal corresponding to the each path. A second adding unit 14 adds output signals of the detecting units 13 corresponding to the individual paths (#1 to #K). A decision unit 15 determines a symbol of an output signal of the second adding unit 14. A multiplying unit 16 multiplies an output signal of the decision unit 15 by the propagation path estimation value that is output from the propagation path estimating means 20 corresponding to the each path of the paths (#1 to #K) and generates a symbol replica corresponding to the each path. A subtracting unit 17 subtracts an (m−1)-th stage symbol replica from an m-th stage symbol replica. A spreading means 18 spreads an output signal of the subtracting unit 17 corresponding to the current(each) path. A third adding unit 19 adds outputs signals of the spreading means 18 corresponding to the individual paths #1 to #K.

On the first stage, a reception signal as an interference cancellation residual signal obtained in an (m−1)-th stage interference canceling process is used. In addition, on the first stage, zero as a symbol replica corresponding to the same user signal on the (m−1)-th stage is used. On the M-th stage, the interference canceling process is not performed. In addition, spread signals as the difference between m-th stage replicas and (m−1)-th stage replicas are output. Instead, demodulated signals are output.

Generally, the characteristics of a parallel process structure interference canceler are inferior to the characteristics of a serial process structure interference canceler. This is because in the serial structure, the interference canceling process can be performed between user signals on each stage. On the other hand, in the parallel process, the interference canceling process can be sequentially performed.

When the interference canceling process is performed for user signals in the order of the largest signal levels, the characteristics are further improved. In the interference canceler shown in FIG. 9, an output signal of each IEU 102-M-N is multiplies by a real number α that is 1 or smaller so as to improve the characteristics of the parallel process. The real number α alleviates the interference canceling process. Thus, all interferences are not canceled on the first stage. Instead, the interferences are gradually canceled on a plurality of stages. In other words, the interference canceling process is alleviated on the first stage that has a large propagation path estimation error and a large determined symbol error. Thus, the interference cancellation error is suppressed. The interference canceling performance is shared with downstream stages that have a small propagation path estimation error and a small determined symbol error. Consequently, the interference cancellation characteristics can be improved.

In the above-described multi-user receiving apparatuses, with a parallel structure, characteristics of a serial interference canceler can be accomplished. However, the characteristics of the conventional multi-user receiving apparatus are not sufficient in comparison with those in the serial structure interference canceler.

SUMMARY OF THE INVENTION

An object of the present invention is to provide a multi-user receiving apparatus that has interference cancellation characteristics similar to those of a serial structure interference canceler and that has a small hardware scale suitable for a base station and a mobile station of a DS-CDMA communication system.

The present invention is a multi-user receiving apparatus for inputting a CDMA (Code Division Multiple Access) reception signal, performing an interference canceling process in parallel for each user signal on an m-th stage of M stages (where m is any integer of $1 \leq m \leq M$, and M is any integer that is 2 or larger), and outputting demodulated signals on the M-th stage, comprising a plurality of IEUs (interference estimating units) disposed corresponding to the (M−1) stages and the number of user signals, and a plurality of subtracting units disposed corresponding to the (M−1)

stages, wherein each of the IEUs inputs an interference cancellation residual signal obtained in an (m−1)-th stage interference canceling process and a signal of which a symbol replica corresponding to the same user signal on the (m−1)-th stage is weighted with a first weighting coefficient, generates an m-th stage symbol replica, outputs the m-th stage symbol replica to the (m+1)-th stage, and outputs a spread signal that is the difference between the m-th stage symbol replica and the (m−1)-th stage symbol replica weighted with the first weighting coefficient, and wherein each of the subtracting units subtracts signals of which the spread signals that are output from the IEUs on the m-th stage are weighted with a second weighting coefficient from a signal of which the (m−1)-th stage interference cancellation residual signal is delayed by a predetermined value and outputs the resultant signal to the (m+1)-th stage.

Each of the IEUs has a plurality of path processing portions corresponding to a plurality of propagation paths as a multi-path, each of the path processing portions having despreading means for inputting the (m−1)-th stage interference cancellation residual signal corresponding to the current path and despreading the interference cancellation residual signal, a first adding unit for adding an output signal of the despreading means and a signal of which the (m−1)-th stage symbol replica is weighted with the first weighting coefficient, a detecting unit for demodulating an output signal of the first adding unit with the propagation path estimation value corresponding to the current path, a second adding unit for adding the output signals of the detecting units corresponding to the individual paths, a decision unit for deciding a symbol of an output signal of the second adding unit, a multiplying unit for multiplying an output signal of the decision unit by the propagation path estimation value corresponding to the current path and generating the m-th stage symbol replica corresponding to the current path, a subtracting unit for subtracting a signal of which the (m−1)-th symbol replica is weighted with the first weighting coefficient from an output signal of the multiplying unit, spreading means for spreading an output signal of the subtracting circuit corresponding to the current path, and a third adding unit for adding output signals of the spreading means corresponding to the individual paths.

A first stage inputs a reception signal as the interference cancellation residual signal obtained in the (m−1)-th stage interference canceling process, wherein zero is used as the (m−1)-th stage symbol replica of the same user signal, and wherein the M-th stage outputs demodulated signals rather than performing the interference canceling process and outputting the m-th stage symbol replicas and the spread signals.

The first weighting coefficient and the second weight coefficient are real numbers that are 1 or smaller.

The first weighting coefficient and the second weighting coefficient on the m-th stage are $[1-(1-\alpha)^{m-1}, \alpha]$, respectively (where $\alpha$ is a real number that is 1 or smaller).

The first weighting coefficient and the second weighting coefficient are 1 and $\alpha$, respectively (where $\alpha$ is a real number that is 1 or smaller).

The first weighting coefficient and the second weighting coefficient are $\alpha$ and $\alpha$, respectively (where $\alpha$ is a real number that is 1 or smaller).

The first weighting coefficient and the second weighting coefficient corresponding to an n-th user signal (where n is any positive integer) on the m-th stage are $[1-(1-\alpha\beta_{n1})(1-\alpha\beta_{n2})\ldots(1-\alpha\beta_{nm-1}), \alpha\beta_{nm}]$, respectively (where $\alpha$ and $\beta_{nm}$ are any real numbers that are 1 or smaller).

The first weighting coefficient and the second weighting coefficient corresponding to an n-th user signal (where n is any positive integer) on the m-th stage are 1 and $\alpha\beta_{nm}$, respectively (where $\alpha$ and $\beta_{nm}$ are any real numbers that are 1 or smaller).

The first weighting coefficient and the second weighting coefficient corresponding to an n-th user signal (where n is any positive integer) on the m-th stage are $\alpha\beta_{nm-1}$ and $\alpha\beta_{nm}$, respectively (where $\alpha$ and $\beta_{nm}$ are any real numbers that are 1 or smaller).

$\alpha$ is assigned depending on the ratio of signal power to interference power of each user signal or on the number of user signals. $\alpha$ is constant for each user signal when the ratio of signal power to interference power for each user is the same and the number of user signals does not vary.

$\beta_{nm}$ is assigned depending on the ratio of signal power to interference power of each slot (transmission power control interval) of each user signal or on the signal power of each slot. $\beta_{nm}$ is assigned depending on each slot of each user signal on each stage.

$\beta_{nm}$ is assigned depending on the likelihood of a determination symbol of each user signal, on the distance from a symbol determination point, or on a symbol power. $\beta_{nm}$ is assigned depending on each symbol of each user signal on each stage.

The present invention is a CDMA (Code Division Multiple Access) multi-user receiving apparatus for performing an interference canceling process for all user signals on a plurality of stages and outputting demodulated signals corresponding to the user signals, each stage comprising a plurality of interference estimating units corresponding to a plurality of paths, each of the interference estimating units having detecting unit for inputting an interference cancellation residual signal obtained on the preceding stage and a signal of which a preceding-stage symbol replica corresponding to the current user signal is weighted with a first weighting coefficient and demodulating the resultant signal with a propagation path estimation value of the current path so as to output a current stage symbol replica and a spread signal that is the difference between the current stage symbol replica and the preceding stage symbol replica is spreaded, a plurality of multiplying units corresponding to the number of paths, each of the multiplying units generating a signal of which the current stage symbol replica is weighted by the current stage first weighting coefficient, a delaying unit for delaying the preceding stage inference residual signal for a predetermined time period, and a subtracting unit for subtracting signals of which the spread signals generated in the interference estimating portions for all the user signals are weighted with a second weighting coefficient from an output signal of the delaying unit and outputting the resultant signal as the next stage interference cancellation residual signal.

In a CDMA communication system according to the present invention, the multi-user receiving apparatus is used for a base station or a mobile station.

The above-described individual means and units allow the interference cancellation characteristics of the parallel process structure multi-user receiving apparatus to improve.

These and other objects, features and advantages of the present invention will become more apparent in light of the following detailed description of a best mode embodiment thereof, as illustrated in the accompanying drawings.

BRIEF DESCRIPTION OF DRAWINGS

FIGS. 4A to 4C are graphs showing chronological variation of a received signal power of each user signal according to the present invention;

DESCRIPTION OF PREFERRED EMBODIMENTS

Next, with reference to the accompanying drawings, embodiments of the present invention will be described.

[First Embodiment]

Figure 1:
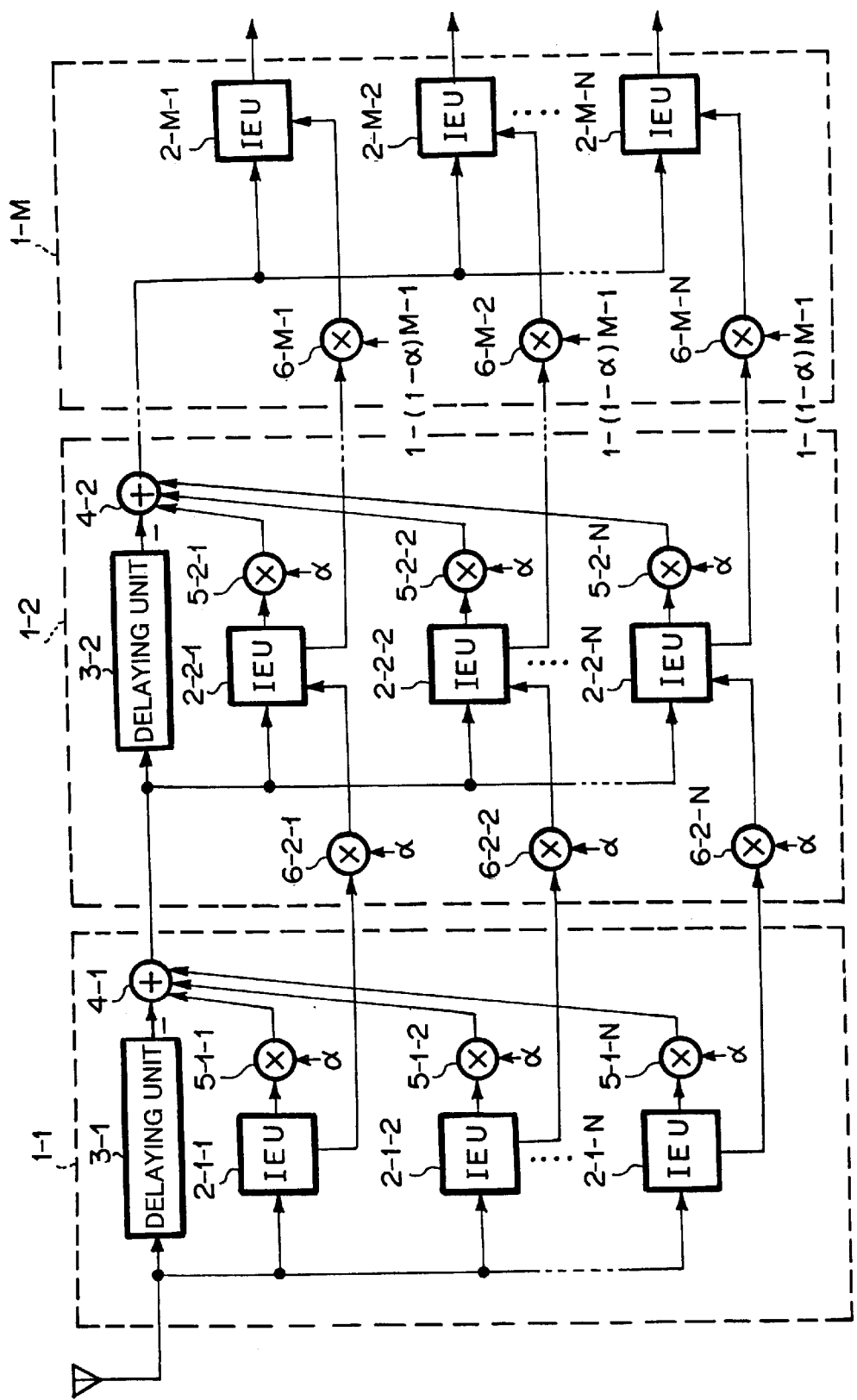
FIG. 1 is a block diagram showing the structure of a multi-user receiving apparatus according to a first embodiment of the present invention.

FIG. 1 is a block diagram showing the structure of a multi-user receiving apparatus according to a first embodiment of the present invention. The multi-user receiving apparatus comprises M receiving units 1-1, . . . , and 1-M on M stages (where M is any integer that is 2 or larger). A receiving unit 1-m (where $1 \leq m \leq M$) on each stage comprises N interference estimating units (referred to as IEU) 2-m-n, a delaying unit 3-m, an adding unit 4-m, a first multiplying unit 6-m-n, and a second multiplying unit 5-m-n. The N IEUs 2-m-n receive N user signals (where N is any integer that is 1 or larger).

The n interference estimating units (IEU) 2-m-n for n user signals (where n is any integer of $1 \leq n \leq N$) on the m-th stage (where m is any integer of $1 \leq m \leq M$) input an interference cancellation residual signal (an output signal of an adding unit 4-(m−1)) obtained in the interference canceling process on the (m−1)-th stage and signals of which symbol replicas corresponding to the same user signals on the (m−1)-th stage are weighted with a first weight coefficient by first multiplying units 6-m-n, generates m-th stage symbol replicas, output the generated symbol replicas to the (m+1)-th stage, and output spread signals that are the difference between the m-th stage symbol replicas and (m−1)-th stage symbol replicas.

The second multiplying units 5-m-n multiply the output signals of the IEUs 2-m-n by a second weighting coefficient. The subtracting unit 4m subtracts the output signals of the multiplying units 5-m-n for all the user signals from a signal of which the (m−1)-th stage interference cancellation residual signal is delayed for the process period of the IEUs by the delaying unit 3-m, updates the interference cancellation residual signal, and outputs the resultant signal to the (m+1)-th stage. The structure of the interference estimating unit (IEU) 2-m-n is the same as that of the conventional IEU shown in FIG. 2.

Figure 2:
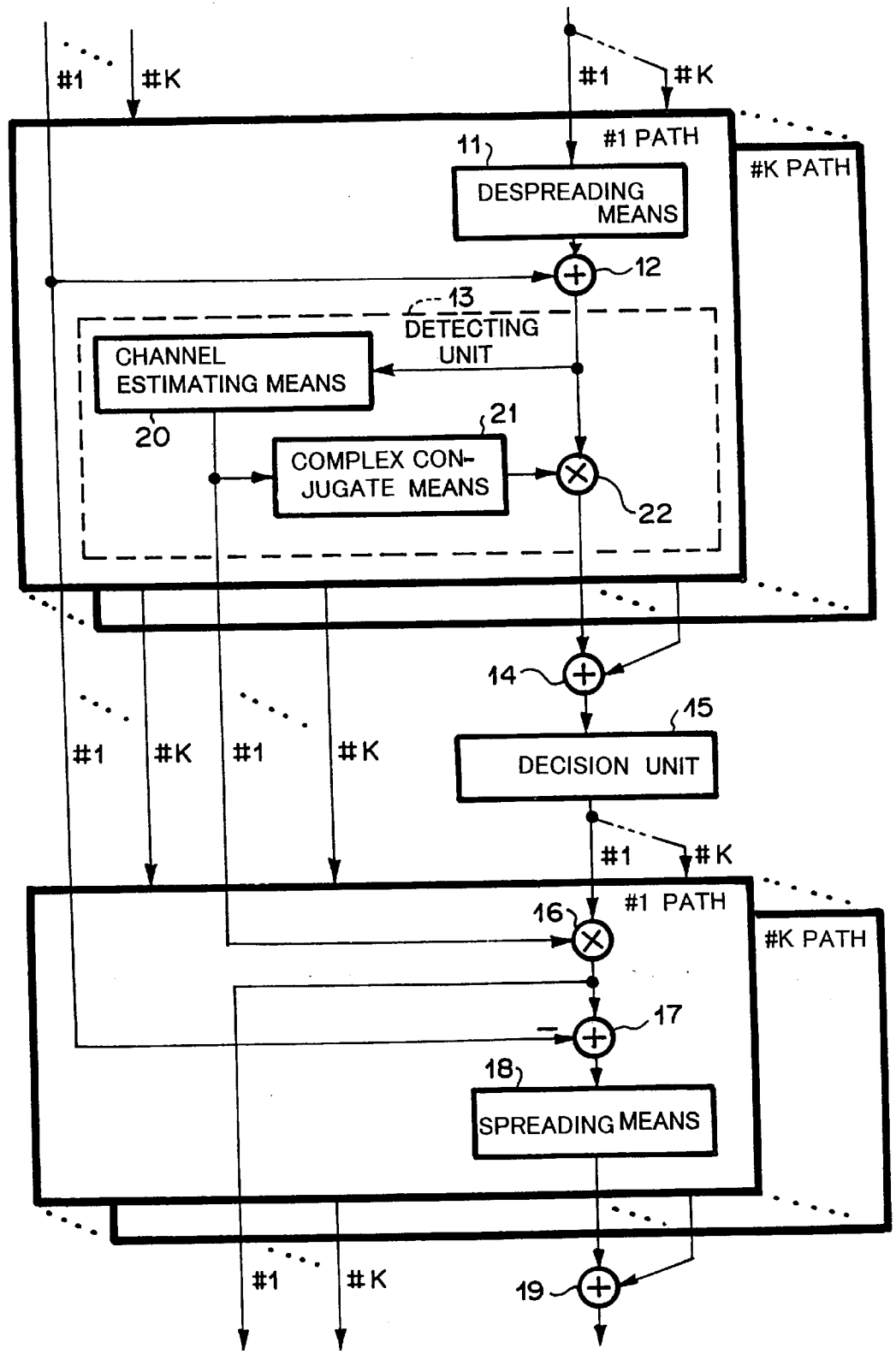
FIG. 2 is a block diagram showing the structure of an interference estimating unit (IEU) according to the present invention.

In FIG. 2, each IEU 2-m-m has a plurality of path processing portions corresponding to a plurality of paths as a multi-path. An despreading means 11 corresponding to each path inputs an (m−1)-th stage interference cancellation residual signal and inversely spreads the interference cancellation residual signal. A first adding unit 12 adds an output signal of the despreading means 11 and an (m−1)-th stage symbol replica corresponding to the current path. A detecting unit 13 inputs an output signal of the first adding unit 12. A complex conjugate means 21 converts a propagation path estimation value received from a propagation path estimating means 20 into a complex conjugate corresponding to the current path. A multiplying unit 22 multiplies the complex conjugate by the output signal of the first adding unit so as to demodulate the signal corresponding to the current path.

A second adding unit 14 adds output signals of the detecting units 13 corresponding to the individual paths. Thus, a path diversity effect can be obtained.

A decision unit 15 determines a symbol of the output signal of the second adding unit 14. In QPSK modulation, the decision unit 15 determines Ich level and Qch level of an orthogonal signal as $(1/\sqrt{2}, 1/\sqrt{2})$, $(-1/\sqrt{2}, 1/\sqrt{2})$, $(-1/\sqrt{2}, -1/\sqrt{2})$, and $(1/\sqrt{2}, -1/\sqrt{2})$ corresponding to the first quadrant, the second quadrant, the third quadrant, and the fourth quadrant, respectively.

Next, a multiplying unit 16 multiplies the output signal of the decision unit 15 by a propagation path estimation value corresponding to the current path and generates an m-th stage symbol replica.

A subtracting unit 17 subtracts the (m−1)-th stage symbol replica from the m-th stage symbol replica. A spreading means 18 spreads the output signal of the subtracting unit 17.

Finally, a third adding unit 19 adds the output signals of the spreading means 18 corresponding to the individual paths. On the first stage, a signal received from an antenna is used as an interference cancellation residual signal obtained in the interference canceling process on the (m−1)-th stage. In addition, zero is used as a symbol replica for the same user signal on the (m−1)-th stage. On the M-th stage, the interference canceling process is not performed. In addition, spread signals that are the difference between the m-th stage replicas and the (m−1)th stage replicas are not output. Instead, demodulated signals corresponding to the individual paths are output.

In the first embodiment, the second multiplying units 5-m-n are disposed on the output side of the IEUs 2-m-n. Alternatively, the second multiplying units 5-m-n may be disposed on the output side of the subtracting units 17 or the spreading means 18 of the IEUs 2-m-n.

As described above, unlike with the related art reference, in the first embodiment, the first multiplying units 6-m-n that weight a first weighting coefficient are disposed. Thus, since the weighting process can be optimally performed, the interference cancellation characteristics can be further improved. The weighting process is performed so as to gradually cancel interferences on a plurality of stages. In other words, the interference canceling process is alleviated on the first stage that has a large propagation path estimation error and a large determined symbol error. Thus, the interference cancellation error is suppressed. The interference canceling performance is shared with' downstream stages that have a small propagation path estimation error and a small determined symbol error. Consequently, the interference cancellation characteristics can be improved.

Next, the first and second weighting effects will be described. Assuming that a propagation path and a symbol are ideally estimated, an interference canceling process for a particular user signal (first user signal) will be described. Assuming that the received signal level of the first user signal is 1, since the symbol replica level is defined as a propagation path estimation value, the symbol replica level R1 on the first stage is 1 (namely, R1=1). Assuming that the weighting coefficient of the second multiplying unit 5-1-1 is α, the signal component e1 of the first user contained in the first stage interference cancellation residual signal that is output from the subtracting unit 4-1 is expressed as follows:

$$e1=1-\alpha R1=1-\alpha \tag{1}$$

Assuming that the weighting coefficient of the first multiplying unit 6-2-1 on the second stage is α, the symbol replica level R2 on the second stage is expressed as follows:

$$R2=e1+\alpha R1=1$$

Thus, the signal level of the first user signal is completely restored. Assuming that the weighting coefficient of the second multiplying unit 5-2-1 is α, the signal component e2 of the first user signal contained in the second stage interference cancellation residual signal is expressed as follows:

$$e2=e1-\alpha(R2-\alpha R1)=(1-\alpha)^2 \tag{2}$$

Likewise, when the weighting coefficient of the first multiplying unit 6-m-n is $1-e_{m-1}=1-(1-\alpha)^{m-1}$, the m-th stage symbol replica level Rm becomes 1 (namely, Rm=1). When the weighting coefficient of the second multiplying unit 5-m-n is always α, the signal component em of the first user signal contained in the m-th stage interference cancellation residual signal is expressed as follows:

$$e_m=(1-\alpha)^m \tag{3}$$

When α is 1 or smaller, if m is sufficiently large, $e_m$ converges to zero. Thus, the interferences can be completely canceled.

To suppress an interference cancellation error, the interference canceling process should be gradually performed. Thus, α should be small. However, since the number of stages M of the interference canceler is limited, α is optimized depending on M. It is clear that the first and second weighting coefficients on the m-th stage are $[1-(1-\alpha)^{m-1}, \alpha]$. However, to simplify the weighting processes, as the first and second weighting coefficients, (1, α) or (α, α) are used. However, in such cases, the characteristics relatively deteriorate.

Although different α values may be used on each stage, it is known that optimum values of α on individual stages are almost equal. However, the effect is small although the weighting processes are complicated. In such a case, when α on the m-th stage is expressed as αm, the first and second weighting coefficients are expressed as $[1-(1-\alpha_1) \ldots (1-\alpha_{m-1}), \alpha_m]$. The present invention is also applied to such a case.

Next, an α determining method will be described. A major cause of the deterioration of the parallel process structure interference canceler is a propagation path estimation error on the first stage. The propagation path estimating error depends on the ratio of signal power to interference power of each user signal. Thus, according to the present invention, the value of α is assigned so that it is proportional to the ratio of signal power to interference power of each user signal.

In the CDMA system, to solve the problem of transmission distance, the transmission power is controlled. In this case, the ratio of signal power to interference power of each user signal is equally controlled. The ratio is reversely proportional to the number of user signals. Thus, according to the present invention, the value of α is assigned so that it is reversely proportional to the number of user signals. Thus, when the ratio of signal power to interference power of each user signal is equal and the number of user signals does not vary, the value of α is constant for the individual user signals.

[Second Embodiment]

Figure 3:
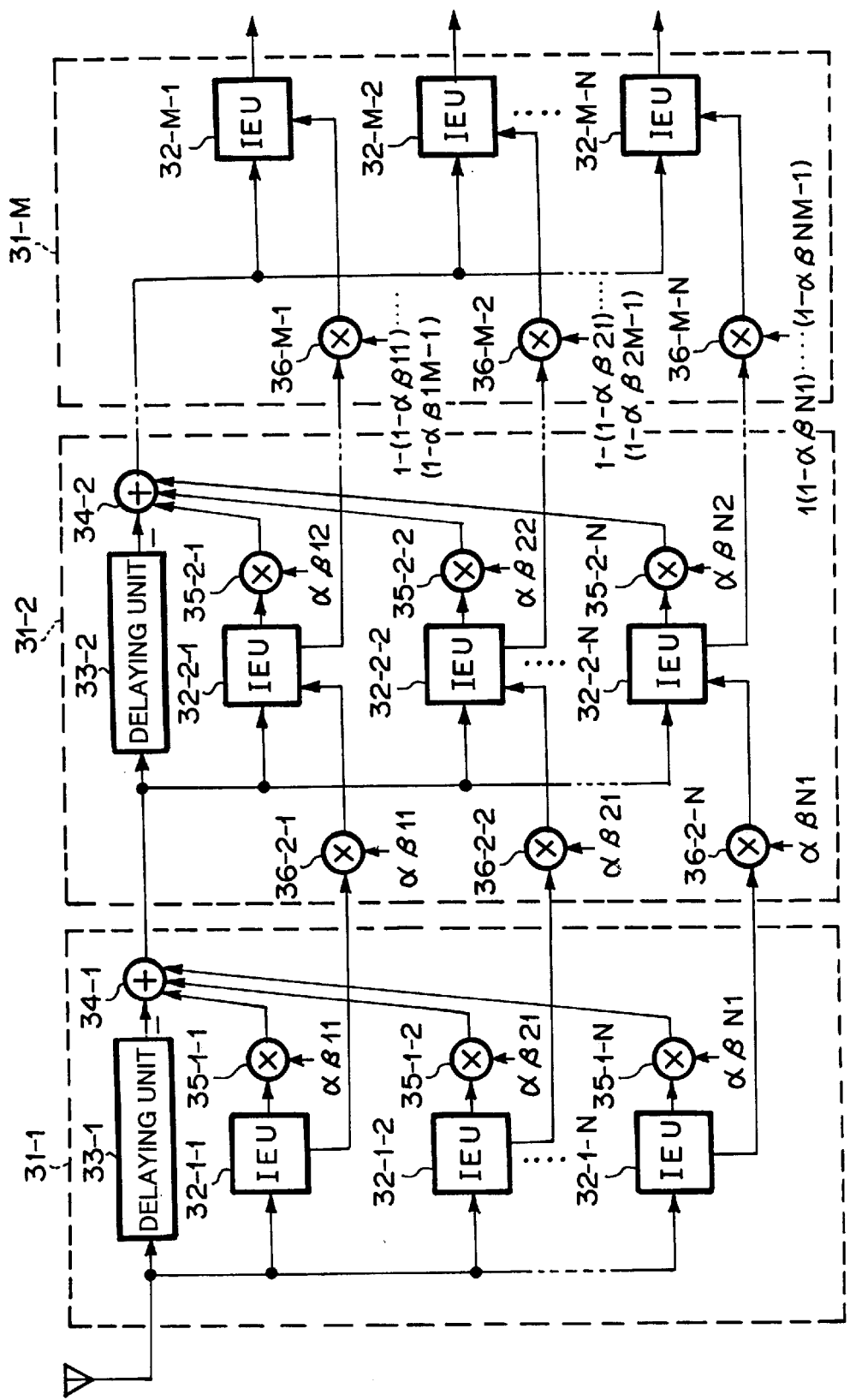
FIG. 3 is a block diagram showing the structure of a multi-user receiving apparatus according to another embodiment of the present invention.

FIG. 3 is a block diagram showing the structure of a multi-user receiving apparatus according to a second embodiment of the present invention. The structure of the multi-user receiving apparatus according to the second embodiment is almost the same as the structure of the multi-user receiving apparatus according to the first embodiment except that a first weighting coefficient of first multiplying units 36-m-n and a second weighting coefficient of second multiplying units 35-m-n of the second embodiment are different from those according to the first embodiment.

The first and second weighting coefficients of the first and second multiplying units are $[1-(1-\alpha\beta_{n1})(1-\alpha\beta_{n2}) \ldots (1-\alpha\beta_{nm-1}), \alpha\beta_{nm}]$.

In this case, the value of α is the same as that of the first embodiment shown in FIG. 1. The value of $\beta_{nm}$ depends on each stage and each user signal. Thus, the value of $\beta_{nm}$ is an adaptive value that chronologically varies. The first weighting coefficient is a product of a constant weighting coefficient α and an adaptive weighting coefficient $\beta_{mn}$. Thus, the weighting process can be flexibly performed. In the weighting method, the signal component $e_m$ of the first user signal contained in the m-th stage interference cancellation residual signal is expressed as follows:

$$e_m=(1-\alpha\beta_{n1})(1-\alpha\beta_{n2}) \ldots (1-\alpha\beta_{nm}) \tag{4}$$

When α and $\beta_{nm}$ are real numbers that are 1 or smaller, they converge to 0. The weighting method according to the second embodiment is different from that according to the first embodiment in that $\beta_{nm}$ varies on each stage and for each user signal. Thus, the interference canceling process for each user signal can be independently controlled.

In other words, when a user signal has a large interference cancellation error due to a propagation path estimation error of an IEU 32-m-n and a symbol error, the interference canceling process is gradually performed so as to suppress the characteristics from deteriorating. The interferences are canceled on downstream stages.

To simplify the first weighting process, (1, $\alpha\beta_{nm}$) and ($\alpha\beta_{nm}-1, \alpha\beta_{nm}$) can be used.

Next, a $\beta_{nm}$ determining method will be described. When the transmission power is ideally controlled, the ratio of signal power to interference power for each user signal is equally controlled. However, actually, a transmission power control error exists. FIGS. 4A to 4C are graphs showing received signal powers of individual user signals in the case that a transmission power control error exists. Since the transmission power is controlled slot by slot, the received signal power varies slot by slot. Since the transmission power control error depends on each user signal, the ratio of signal power to interference power at each slot varies for each user signal. FIGS. 4A to 4C show the state that the received signal power of each user signal #1 to #N varies against an average signal power slot by slot. Thus, according to the present invention, the value of $\beta_{nm}$ is assigned so that it is proportional to the ratio of signal power to interference power of each slot.

As a real method, each slot signal power of each user signal is measured. An average signal power of all user signals is obtained. Corresponding to the ratio of each slot signal power of each user signal to average power of all user signals, $\beta_{nm}$ is determined. In other words, the following relations are satisfied:

$$\beta_{nm}=\text{SQRT }(P_{nm}/((P_{1m}+P_{2m}+\ldots+P_{Nm})/N)), \beta_{nm}=1(\beta_{nm}\geq 1)$$

where $P_{nm}$ is each slot signal power of a n-th user signal on an m-th stage. In this case, $\beta_{nm}$ is calculated with SQRT. Alternatively, any nonlinear scale can be used.

When the number of user signals is sufficiently large, the average power of all the user signals is almost equal to the average signal power of one user signal. Thus, each slot signal power of each user may be normalized with the average signal power. In other words, the following relations are satisfied:

$$\beta_{nm}=\text{SQRT}(P_{nm}/A(P_{nm})), \beta_{nm}=1(\beta_{nm}\geq 1)$$

where $A(P_{nm})$ is the average signal power of the n-th user signal on the m-th stage. Since $\beta_{nm}$ depends on each slot of each user signal, the deterioration of characteristics due to fluctuation of signal powers of individual user signals corresponding to a transmission power control error can be suppressed.

Next, another $\beta_{nm}$ determining method will be described. In the method, an interference cancellation error due to a determination symbol error can be suppressed. In a nonlinear interference canceler corresponding to the symbol determining method, a determination symbol error results in a large interference cancellation error. For example, when a symbol error takes place in BPSK, a symbol interference that is 6 dB higher than the original symbol occurs rather than canceling interference.

Thus, when a symbol determination error takes place, if the interference canceling process is not performed, characteristics improve. However, when a signal is demodulated, a symbol determination error cannot be detected.

Thus, according to the present invention, the likelihood of a determination symbol is estimated with a pre-determined reception symbol that has been normalized with an average signal power. When the likelihood is small and thereby the probability of occurrence of a determination symbol error is high, a small value is assigned to $\beta_{nm}$.

Figure 5:
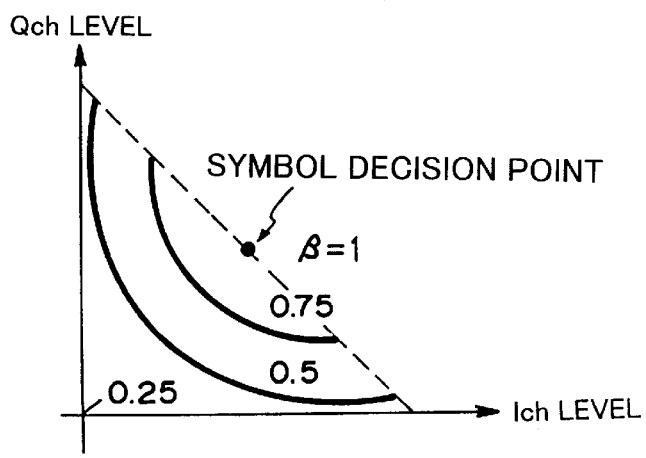
FIG. 5 is a graph showing an example of a $\beta_{nm}$ determining method according to the present invention.

FIG. 5 is a graph showing an example of a $\beta_{nm}$ determining method corresponding to the likelihood. In FIG. 5, coordinates of Ich level and Qch level of an orthogonal signal are illustrated. Thus, in FIG. 5, the relation between a reception symbol and coefficient $\beta$ is represented. In the method, the likelihood is calculated with the reception symbol and the ratio of signal power to interference power.

Likelihood=(probability of which determination symbol is received as reception symbol)/(sum of probability of which each modulation symbol in QPSK is received as reception symbol)

In QPSK, the likelihood at the center of the coordinate is 0.25. The likelihood at the symbol determination point is close to 1. The likelihood is low in the vicinity of the center of the coordinates and on I and Q axes. In FIG. 5, an upper right area of $\beta_{nm}=1$ for a 50% symbol is delimited with a dashed line. The area can be freely set.

As another method, phase likelihood is used.

Phase likelihood=|(phase of determination symbol)−(phase of reception symbol)|

In QPSK, the phase likelihood ranges from 0 to 45°. The phase likelihood should be converted into $\beta_{nm}$. For simplicity, when the phase likelihood is 0°, $\beta_{nm}$ is 1; when the phase likelihood is 45°, $\beta_{nm}$ is 0.

Figure 6:
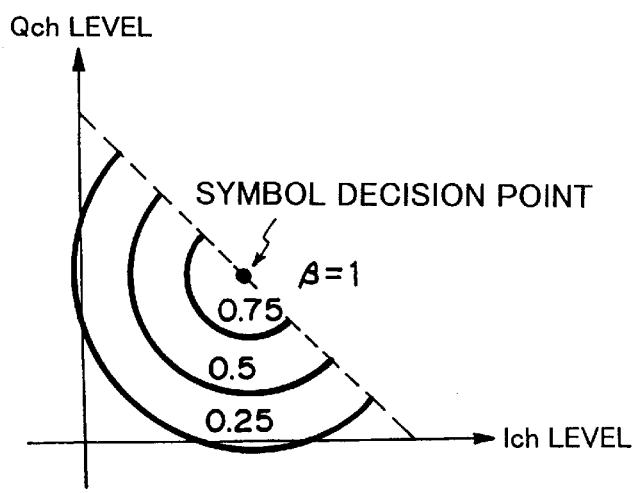
FIG. 6 is a graph showing another example of the $\beta_{nm}$ determining method according to the present invention.

Such methods are not practical because complicated calculations are required for obtaining likelihood. As a simple method for determining $\beta_{nm}$, as IQ coordinates shown in FIG. 6, the distance from a symbol determination point is used. When a reception symbol is present at the symbol determination point, $\beta_{nm}$ is assigned so that it is reversely proportional to the distance to the symbol determination point. For example, when the reception symbol is present at the symbol determination point, $\beta_{nm}=1$. When the reception symbol is present at the center of the coordinates, $\beta_{nm}=0$. In an upper right area delimited with a dashed line, $\beta_{nm}=1$. Since these characteristics are similar to a likelihood curve, the characteristics can be effectively used.

Figure 7:
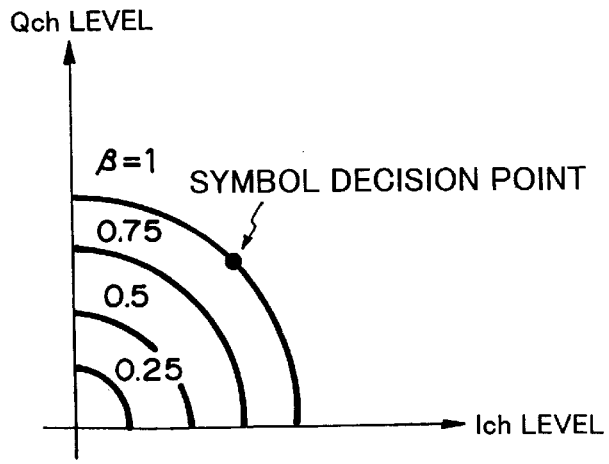
FIG. 7 is a graph showing a further example of the $\beta_{nm}$ determining method according to the present invention.
Figure 8:
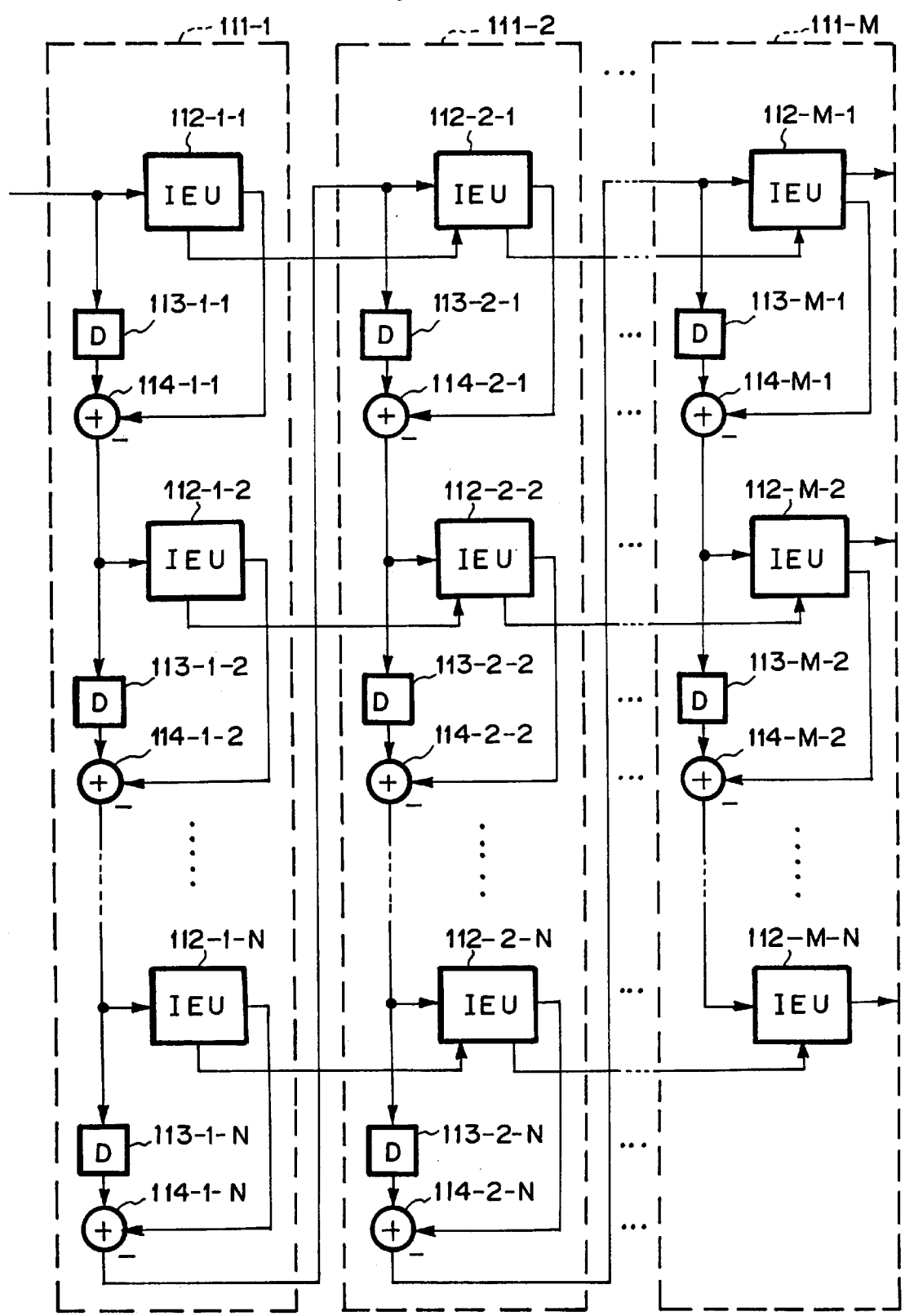
FIG. 8 is a block diagram showing an example of the structure of a conventional serial structure multi-user receiving apparatus.
Figure 9:
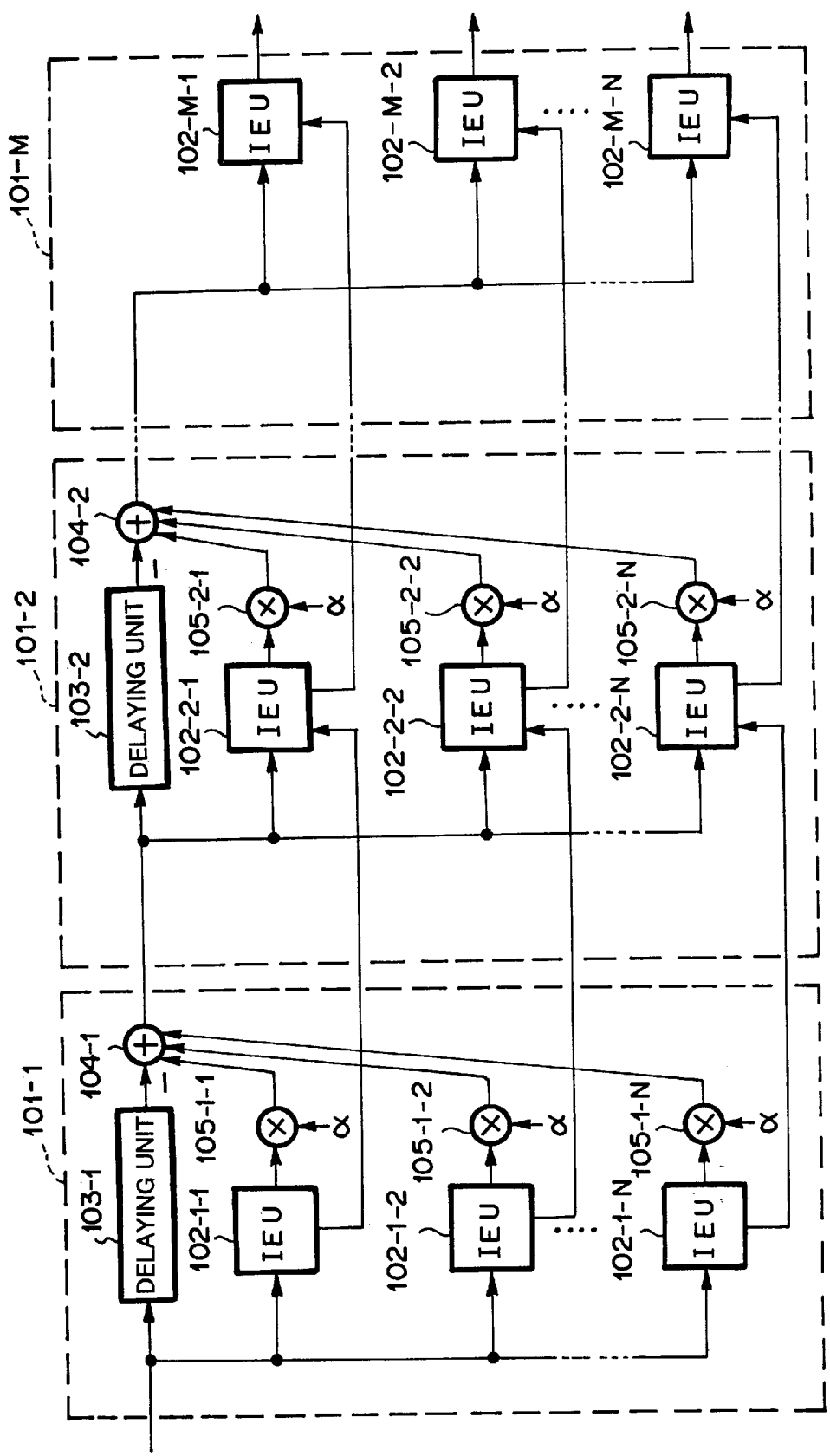
FIG. 9 is a block diagram showing an example of the structure of a conventional multi-user receiving apparatus.

Next, with reference to FIG. 7, another $\beta_{nm}$ determining method that uses a symbol power will be described on IQ coordinates. In the method, the following relations are satisfied:

$$\beta_{nm}=\text{SQRT}(P_{nm}/A(P_{nm})), \beta_{nm}=1(\beta_{nm}\geq 1)$$

where $P_{nm}$ is the symbol power at particular time of the n-th user on the m-th stage; and $A(P_{nm})$ is the average signal power. In this case, $\beta_{nm}$ is calculated with SQRT. Alternatively, any nonlinear scale can be used. Thus, when $\beta_{nm}$ varies on each stage, for each user signal, for each symbol, the deterioration of characteristics due to a determination symbol error can be suppressed.

The above-described methods are only examples of the present invention. In other words, there will be many variations of the above-described methods.

FIGS. 1 and 2 show the structures of which interferences of all user signals are canceled in parallel. However, the present invention can be applied to a serial-parallel hybrid structure interference canceler of which a parallel process is partly performed and a serial process is performed for a parallel process user signal. In this case, the above-described effects can be obtained. Such a structure is included in the scope of the present invention.

It should be noted that the above-described embodiments may be applied to a short code spread modulation of which a spread code period is equal to a symbol period or to a long code spread modulation of which a spread code period is longer than a symbol period.

As described above, according to the present invention, a multi-user receiving apparatus with a parallel process structure that is simple and that is a small delay of demodulating process is provided. In addition, a symbol replica generated in an interference estimating unit is weighted with a first weighting coefficient. A interference cancellation residual signal is weighted with a second weighting coefficient. The weighting coefficients are varied for each user signal. Thus, the interference cancellation characteristics can be improved as with the serial structure.

In the multi-user receiving apparatus according to the present invention, the characteristics of the interference canceler with parallel process structure can be further improved as with a serial structure interference canceler.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A multi-user receiving apparatus for inputting a CDMA (Code Division Multiple Access) reception signal, performing an interference canceling process in parallel for each user signal on an m-th stage of M stages (where m is any integer of $1 \leq m \leq M$; and M is any integer that is 2 or larger), and outputting demodulated signals on the M-th stage, comprising:

a plurality of IEUs (interference estimating units) disposed corresponding to the (M) stages and the number of user signals; and a plurality of subtracting units disposed corresponding to the (M−1) stages, wherein each of the IEUs inputs an interference cancellation residual signal obtained in an (m−1)-th stage interference canceling process and a signal of which a symbol replica corresponding to the same user signal on the (m−1)-th stage is weighted with a first weighting coefficient, generates an m-th stage symbol replica, outputs the m-th stage symbol replica to the (m+1)-th stage, and outputs a spread signal that is the difference between the m-th stage symbol replica and the (m−1)-th stage symbol replica weighted with the first weighting coefficient, and wherein each of the subtracting units subtracts signals of which the spread signals that are output from the IEUs on the m-th stage are weighted with a second weighting coefficient from a signal of which the (m−1)-th stage interference cancellation residual signal is delayed by a predetermined value and outputs the resultant signal to the (m+1)-th stage.

2. The multi-user receiving apparatus as set forth in claim 1, wherein each of the IEUs has a plurality of path processing portions corresponding to a plurality of channels as a multi-path, each of the path processing portions having:

despreading means for inputting the (m−1)-th stage interference cancellation residual signal and despreading the interference cancellation residual signal;

a first adding unit for adding an output signal of the despreading means and a signal of which the (m−1)-th stage symbol replica is weighted with the first weighting coefficient;

a detecting unit for demodulating an output signal of the first adding unit with the channel estimation value corresponding to each path;

a second adding unit for adding the output signals of the detecting units corresponding to the individual paths;

a decision unit for determining a symbol of an output signal of the second adding unit;

a multiplying unit for multiplying an output signal of a decision unit by the channel estimation value corresponding to each path and generating the m-th stage symbol replica corresponding to each path;

a subtracting unit for subtracting a signal of which the (m−1)-th stage symbol replica is weighted with the first weighting coefficient from an output signal of the multiplying unit;

spreading means for spreading an output signal of the subtracting circuit corresponding to each path; and a third adding unit for adding output signals of the spreading means corresponding to the individual paths.

3. A CDMA communication system having a multi-user receiving apparatus as set forth in claim 2, wherein the multi-user receiving apparatus is used for a base station or a mobile station.

4. The multi-user receiving apparatus as set forth in claim 1, wherein a first stage inputs a reception signal as the interference cancellation residual signal obtained in the (m−1)-th stage interference canceling process, wherein zero is used as the (m−1)-th stage symbol replica of the same user signal, and wherein the M-th stage outputs demodulated signals rather than performing the interference canceling process and outputting the m-th stage symbol replicas and the spread signals.

5. A CDMA communication system having a multi-user receiving apparatus as set forth in claim 4, wherein the multi-user receiving apparatus is used for a base station or a mobile station.

6. The multi-user receiving apparatus as set forth in claim 1, wherein the first weighting coefficient and the second weight coefficient are real numbers that are 1 or smaller.

7. The multi-user receiving apparatus as set forth in claim 6, wherein the first weighting coefficient and the second weighting coefficient on the m-th stage are $[1-(1-\alpha)^{m-1}, \alpha]$, respectively (where $\alpha$ is a real number that is 1 or smaller).

8. The multi-user receiving apparatus as set forth in claim 7, wherein $\alpha$ is assigned depending on the ratio of signal power to interference power of each user signal or on the number of user signals, and wherein $\alpha$ is constant for each user signal when the ratio of signal power to interference power for each user is the same and the number of user signals does not vary.

9. The multi-user receiving apparatus as set forth in claim 6, wherein the first weighting coefficient and the second weighting coefficient are 1 and $\alpha$, respectively (where $\alpha$ is a real number that is 1 or smaller).

10. The multi-user receiving apparatus as set forth in claim 9, wherein $\alpha$ is assigned depending on the ratio of signal power to interference power of each user signal or on the number of user signals, and wherein $\alpha$ is constant for each user signal when the ratio of signal power to interference power for each user is the same and the number of user signals does not vary.

11. The multi-user receiving apparatus as set forth in claim 6, wherein the first weighting coefficient and the second weighting coefficient are $\alpha$ and $\alpha$, respectively (where $\alpha$ is a real number that is 1 or smaller).

12. The multi-user receiving apparatus as set forth in claim 11, wherein $\alpha$ is assigned depending on the ratio of signal power to interference power of each user signal or on the number of user signals, and wherein $\alpha$ is constant for each user signal when the ratio of signal power to interference power for each user is the same and the number of user signals does not vary.

13. The multi-user receiving apparatus as set forth in claim 6, wherein the first weighting coefficient and the second weighting coefficient corresponding to an n-th user signal (where n is any positive integer) on the m-th stage are $[1-(1-\alpha\beta_{n1})(1-\alpha\beta_{n2})\ldots(1-\alpha\beta_{nm-1}), \alpha\beta_{nm}]$, respectively (where $\alpha$ and $\beta_{nm}$ are any real numbers that are 1 or smaller).

14. The multi-user receiving apparatus as set forth in claim 13, wherein $\alpha$ is assigned depending on the ratio of signal power to interference power of each user signal or on the number of user signals, and wherein $\alpha$ is constant for each user signal when the ratio of signal power to interference power for each user is the same and the number of user signals does not vary.

15. The multi-user receiving apparatus as set forth in claim 13, wherein $\beta_{nm}$ is assigned depending on the ratio of signal power to interference power of each slot (transmission power control interval) of each user signal or on the signal power of each slot, and wherein $\beta_{nm}$ is assigned depending on each slot of each user signal on each stage.

16. The multi-user receiving apparatus as set forth in claim 13, wherein $\beta_{nm}$ is assigned depending on the likelihood of a determination symbol of each user signal, on the distance from a symbol determination point, or on a symbol power, and wherein $\beta_{nm}$ is assigned depending on each symbol of each user signal on each stage.

17. The multi-user receiving apparatus as set forth in claim 6, wherein the first weighting coefficient and the second weighting coefficient corresponding to an n-th user signal (where n is any positive integer) on the m-th stage are 1 and $\alpha\beta_{nm}$, respectively (where $\alpha$ and $\beta_{nm}$ are any real numbers that are 1 or smaller).

18. The multi-user receiving apparatus as set forth in claim 17, wherein $\alpha$ is assigned depending on the ratio of signal power to interference power of each user signal or on the number of user signals, and wherein $\alpha$ is constant for each user signal when the ratio of signal power to interference power for each user is the same and the number of user signals does not vary.

19. The multi-user receiving apparatus as set forth in claim 17, wherein $\beta_{nm}$ is assigned depending on the ratio of signal power to interference power of each slot (transmission power control interval) of each user signal or on the signal power of each slot, and wherein $\beta_{nm}$ is assigned depending on each slot of each user signal on each stage.

20. The multi-user receiving apparatus as set forth in claim 17, wherein $\beta_{nm}$ is assigned depending on the likelihood of a determination symbol of each user signal, on the distance from a symbol determination point, or on a symbol power, and wherein $\beta_{nm}$ is assigned depending on each symbol of each user signal on each stage.

21. The multi-user receiving apparatus as set forth in claim 6, wherein the first weighting coefficient and the second weighting coefficient corresponding to an n-th user signal (where n is any positive integer) on the m-th stage are $\alpha\beta_{nm-1}$ and $\alpha\beta_{nm}$, respectively (where $\alpha$ and $\beta_{nm}$ are any real numbers that are 1 or smaller).

22. The multi-user receiving apparatus as set forth in claim 21, wherein $\alpha$ is assigned depending on the ratio of signal power to interference power of each user signal or on the number of user signals, and wherein $\alpha$ is constant for each user signal when the ratio of signal power to interference power for each user is the same and the number of user signals does not vary.

23. The multi-user receiving apparatus as set forth in claim 21, wherein $\beta_{nm}$ is assigned depending on the ratio of signal power to interference power of each slot (transmission power control interval) of each user signal or on the signal power of each slot, and wherein $\beta_{nm}$ is assigned depending on each slot of each user signal on each stage.

24. The multi-user receiving apparatus as set forth in claim 21, wherein $\beta_{nm}$ is assigned depending on the likelihood of a determination symbol of each user signal, on the distance from a symbol determination point, or on a symbol power, and wherein $\beta_{nm}$ is assigned depending on each symbol of each user signal on each stage.

25. A CDMA communication system having a multi-user receiving apparatus as set forth in claim 6, wherein the multi-user receiving apparatus is used for a base station or a mobile station.

26. A CDMA communication system having a multi-user receiving apparatus as set forth in claim 1, wherein the multi-user receiving apparatus is used for a base station or a mobile station.

27. A CDMA (Code Division Multiple Access) multi-user receiving apparatus for performing an interference canceling process for all user signals on a plurality of stages and outputting demodulated signals corresponding to the user signals, each stage comprising:

a plurality of interference estimating units corresponding to a plurality of paths, each of the interference estimating units having detecting unit for inputting an interference cancellation residual signal obtained on the preceding stage and a signal of which a preceding-stage symbol replica corresponding to the current user signal is weighted with a first weighting coefficient and demodulating the resultant signal with a propagation path estimation value of each path so as to output a current stage symbol replica and a spread signal that is the difference between the current stage symbol replica and the preceding stage symbol replica is spreaded;

a plurality of multiplying units corresponding to the number of paths, each of the multiplying units generating a signal of which the current stage symbol replica is weighted by the current stage first weighting coefficient;

a delaying unit for delaying the preceding stage inference residual signal for a predetermined time period; and a subtracting unit for subtracting signals of which the spread signals generated in the interference estimating portions for all the user signals are weighted with a second weighting coefficient from an output signal of the delaying unit and outputting the resultant signal as the next stage interference cancellation residual signal.

28. The multi-user receiving apparatus as set forth in claim 27,
   wherein the first weighting coefficient and the second weight coefficient are real numbers that are 1 or smaller.

29. A CDMA communication system having a multi-user receiving apparatus as set forth in claim 28,
   wherein the multi-user receiving apparatus is used for a base station or a mobile station.

30. The multi-user receiving apparatus as set forth in claim 27,
   wherein the first weighting coefficient is any real number that is 1 or smaller and the first weighting coefficient varies on each stage, and
   wherein the second weighting coefficient is any real number that is 1 or smaller and the second weighting coefficient is constant on each stage.

31. A CDMA communication system having a multi-user receiving apparatus as set forth in claim 30,
   wherein the multi-user receiving apparatus is used for a base station or a mobile station.

32. A CDMA communication system having a multi-user receiving apparatus as set forth in claim 27,
   wherein the multi-user receiving apparatus is used for a base station or a mobile station.

* * * * *